Feb. 28, 1956     K. B. SORENSEN ET AL     2,736,155
BACK RACK FRAME FOR BEET HARVESTERS
Filed Oct. 10, 1952     2 Sheets-Sheet 1

INVENTORS.
KNUD B. SORENSEN
FRANCIS M. BRINKMEYER
BY
ATTORNEYS

Feb. 28, 1956 K. B. SORENSEN ET AL 2,736,155
BACK RACK FRAME FOR BEET HARVESTERS
Filed Oct. 10, 1952 2 Sheets-Sheet 2

INVENTORS.
KNUD B. SORENSEN
FRANCIS M. BRINKMEYER
BY
ATTORNEYS

United States Patent Office 2,736,155
Patented Feb. 28, 1956

2,736,155

BACK RACK FRAME FOR BEET HARVESTERS

Knud B. Sorensen, Rock Island, and Francis M. Brinkmeyer, Moline, Ill., assignors to Deere & Company, Moline, Ill., a corporation of Illinois Application October 10, 1952, Serial No. 314,068

6 Claims. (Cl. 56—121.45)

The present invention relates generally to agricultural machines and most particularly to sugar beet harvesters.

The object and general nature of the present invention is the provision of a new and improved topping mechanism, particularly new and improved means for holding the severed tops up against a top pickup unit, preferably in the form of a drum, which serves to remove the tops from the topping knife and convey them onto a cross conveyor forming a part of the harvester. More particularly, it is a feature of the present invention to provide new and improved top holding means in the form of a back rack structure particularly constructed and designed to yield in the event a stone, a heavy clod, a large beet, or an unusually large mass of tops is carried over by the top pick-up drum.

Additionally, it is a feature of this invention to provide a back rack structure that includes a generally laterally shiftable back rack frame, with top-engaging fingers pivotally carried on said frame, the top-engaging fingers being yieldably held against the tops as they are moved over the pickup drum from the topping knife. Specifically, it is a feature of this invention to provide a system of generally vertically disposed parallel links for supporting the back rack for generally translational movement, toward and away from the pickup drum, with spring means yieldably urging the back rack frame for movement toward said drum, and additionally, it is a feature of this invention to provide individually mounted and individually adjustable top-engaging fingers pivotally carried by said translationally movable frame and bias for movement toward the top pickup drum by individual spring means.

These and other objects and advantages of the present invention will be apparent to those skilled in the art after a consideration of the following detailed description, taken in conjunction with the accompanying drawings, in which.

Figure 1:
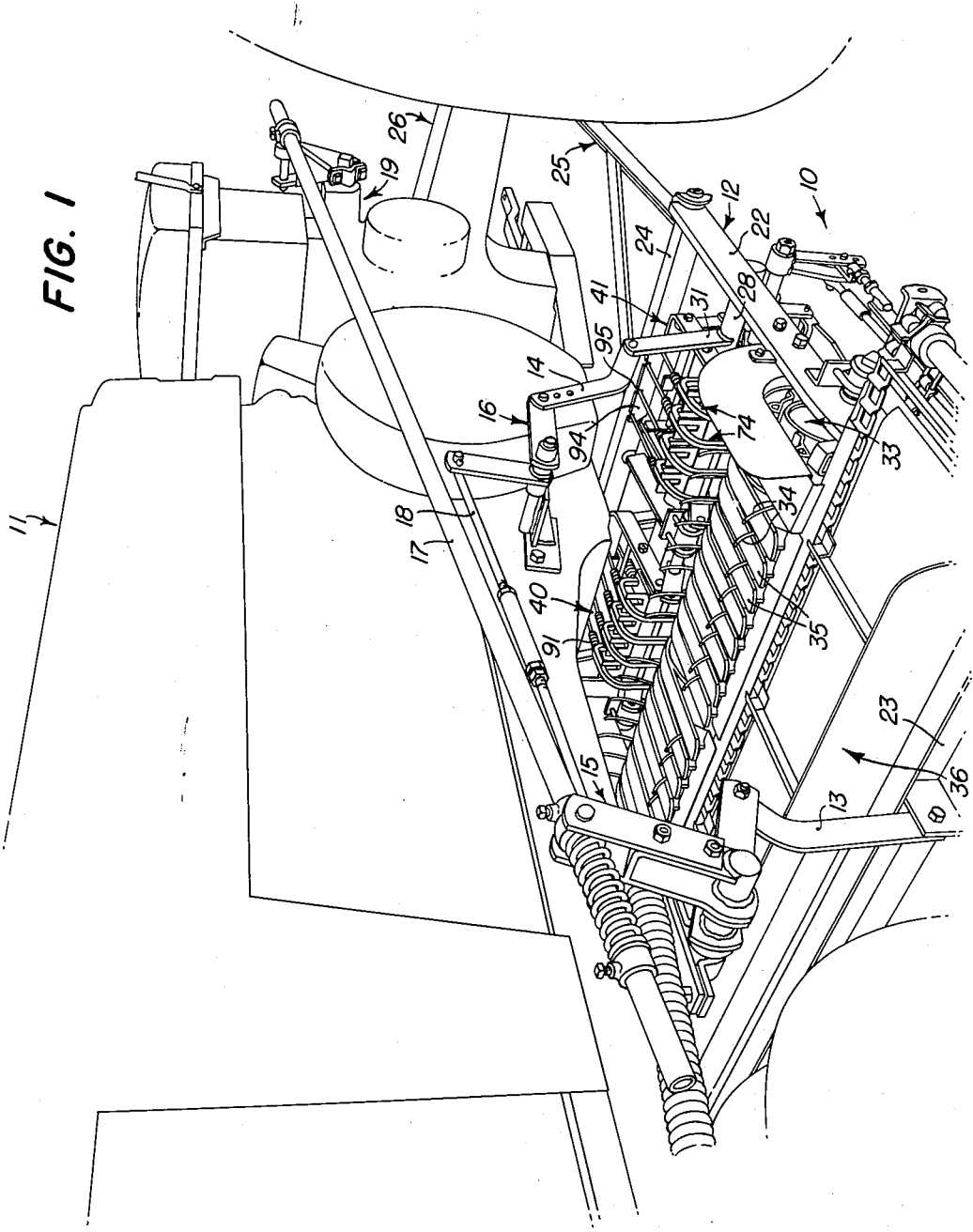
Figure 1 is a perspective view showing portions of the topping mechanism of a beet harvester, in which the principles of the present invention have been incorporated.

Referring first to Figure 1, the beet harvester in which the principles of the present invention have been incorporated, is illustrated as including a topping mechanism 10 mounted on the underside of a farm tractor 11. The latter is of conventional construction so far as the present invention is concerned, and the topping mechanism 10 comprises a supporting or topping frame 12 supported at its front and rear ends by generally vertical links 13 and 14 that are connected at the upper ends to bell cranks 15 and 16 mounted for rocking movement on the tractor and controlled by connections 17 and 18 extending between the bell cranks 15 and 16 and a power lift unit 19 carried by or forming a part of the tractor.

Figure 2:
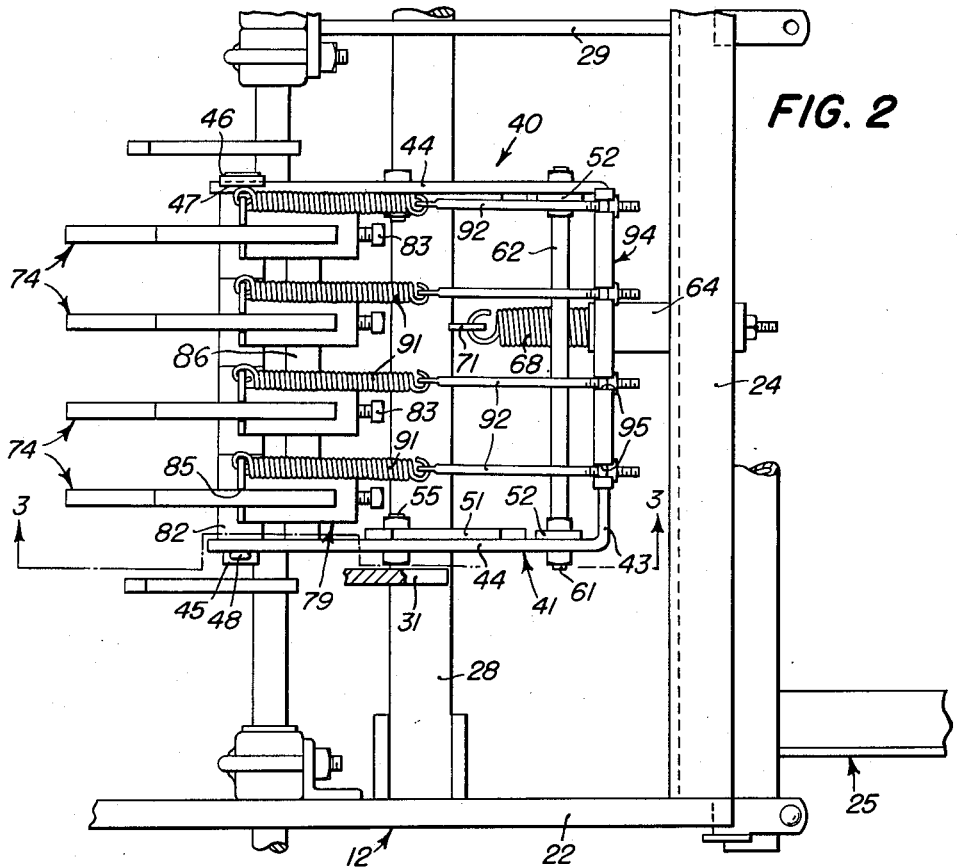
Figure 2 is an enlarged fragmentary plan view with parts in section of the back rack structure shown in Figure 1, certain parts being omitted in the interest of clarity.

A topping frame 12 includes a plurality of generally fore and aft extending frame bars 22 and front and rear cross bars 23 and 24, together with other frame structure referred to in detail below. Only one of the two bars 22 is shown in the drawings. A front cross bar 23 pivotally receives the front supporting links 13, and the rear ends of the side bars 22 are securely fixed, as by any suitable means (not shown), to the ends of the rear cross bar 24. The latter may be in the form of an angle, as shown in Figure 2. A push frame 25 is connected between the rear axle 26 of the tractor and the topping frame 12. Forming a part of the latter unit is a cross shaft 28, preferably fixed at its ends to the side bars 22, and also to a center bar 29. Upstanding brackets 31 are fixed to the cross shaft 28 and are apertured at the upper ends to receive the pivot means connecting the lower ends of the rear supporting links 14 thereto.

The topping frame 12 carries a top pickup drum or top pickup unit 33. This unit consists of a rotatable member extending transversely of the tractor carrying top-engaging fingers 34. The drum 33 is rotated in such a direction that the upper ends of the fingers 34, as shown in Figure 1, move forwardly between stripper bars 35 and sweep tops and the like forwardly onto a cross conveyor 36. The lower portion of the fingers 34 move rearwardly relative to the topping knife or knives, in substantially the same manner as the operation of the top pickup drum shown in U. S. Patent 2,433,799, issued December 30, 1947, to C. W. Walz et al., to which reference may be made if necessary.

As will be seen from Figure 1, the back rack structure of the present invention, indicated in its entirety by the reference numeral 40, is carried on the frame 12 just rearwardly of the topping drum 33 and functions to maintain the severed tops in operative connection with the teeth or fingers 34 of the top pickup unit as the latter rotates in a direcion to sweep the tops rearwardly from the topping knives, and then upwardly therefrom and lastly forwardly over onto the cross conveyor 36.

Figure 3:
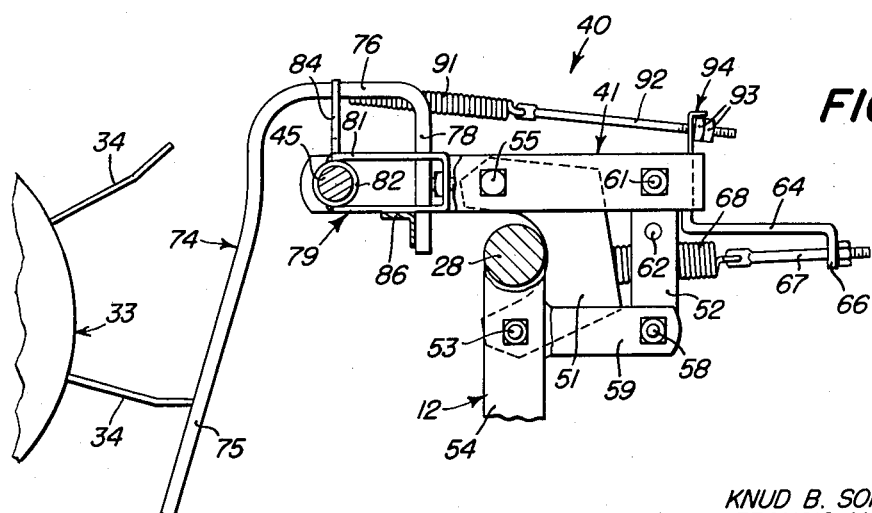
Figure 3 is a sectional view taken generally along the line 3—3 of Figure 2.

The back rack structure 40 is best shown in Figures 2 and 3 and comprises a back rack frame 41 which consists of a U-shaped strap member 43 of generally rectangular configuration and including side sections 44 which are apertured at the forward ends to receive a cross shaft 45 held against rotation relative to the side sections 44. To this end, the cross shaft 45 carries a plate 46 held, as by welding, to the shaft 45 and provided with an overhanging portion 47 that engages the upper edge of the right hand side frame section 44. The other end of the shaft 45 is apertured to receive a retaining pin or colter 48.

The back rack frame 41 is mounted for generally fore and aft translational movement relative to the topping frame 12 by means of pairs of generally parallel links 51 and 52. The front links 51 are in the form of generally U-shaped parts having lower sections pivotally connected, as at 53, with depending brackets 54 (only one of which is shown in the drawings) forming a part of the frame 12, the upper portions of the U-shaped links 51 being disposed generally above the cross bar 28 and apertured to receive pivot bolts 55 by which the upper ends of the links 51 are pivotally connected to the back rack frame 41. The links 51 are curved so as to clear the cross bar 28, as will be seen from Figure 3. The rear links 52 are pivotally connected, as by bolts 58, with rearwardly extending brackets 59 carried on the depending brackets 54. The upper ends of the links 52 are apertured to receive pivot bolts 61 that are carried by the rear portion of the back rack frame 41. The rear links 52 are interconnected by cross member 62 to provide lateral rigidity. A rearwardly extending bracket 64 is connected, as by welding, to the rear portion of the back rack frame member 43, and the rear end of the bracket 64 is turned downwardly, as at 66, and apertured to receive the rear end of an adjusting rod 67, the forward end of which is connected to a spring 68. The front end of the spring 68 is connected to a clip 71 welded or otherwise fixed to the cross bar 28 of the topping frame 12. The spring 68 therefore functions to yieldably urge the back rack frame 41 forwardly into operative association with the topping drum 33. The engagement of the curved portions of the forward links 51 with the cross bar 28 serves to limit the forward movement of the back rack structure relative to the topping frame 12 on which the back rack structure is mounted.

Mounted on the back rack frame 41 at the forward portion thereof is a plurality of top-engaging fingers 74. Best shown in Figure 3, each of these fingers 74 includes top-engaging means in the form of a forward downwardly elongated section 75, an upper curved section 76, and a downwardly depending section 78. The latter section of each of the fingers 74 is adapted to be adjustably disposed in an associated bracket 79 that is rockably mounted on the shaft 45 that forms a part of the back rack frame 41. As best shown in Figure 3, each of the brackets 79 includes a U-shaped part 81 having upper and lower portions that are welded or otherwise fixed to a sleeve section 82 mounted for rocking movement on the associated cross shaft 45. A clamping set screw 83 (Figure 2) serves to fix the associated vertically extending finger section 78 in different positions of adjustment vertically relative to the brackets 79. For stabilizing the associated top-engaging finger 74, each of the brackets 79 include an upwardly directed extension 84 that is provided with an elongated slot 85 receiving the upper portion 76 of the associated finger 74, the slot 85 being of sufficient vertical extent to accommodate disposing the finger in different vertical positions.

As will be seen from Figure 2, there are four fingers 74 constructed and mounted as described above, and each is individually swingable relative to the supporting bar or shaft 45. Fixed to the underside of the frame 41 is a stop member in the form of an angle 86 against which the lower sides of the brackets 79 are adapted to bear. For the purpose of holding the fingers 74 in the position shown, with the brackets 79 engaging the stop bar 86, a spring 91 is connected at its forward end to the upper portion of the extension 84. The rear end of each of the springs 91 is connected to a link 92, the rear end of which is threaded and receives a pair of lock nuts 93. The latter bear against a bracket 94 in the form of a laterally elongated plate having slots 95 in its upper edge to receive the rear ends of the links 92. As will be seen from Figures 2 and 3, the action of the springs 91 is to yieldably hold the fingers 74 in forwardmost position, namely, with the brackets 79 against the stop bar 86 and with the lower or top engaging portions 75 of the fingers relatively closely adjacent the top pickup drum 33.

In operation, the fingers 74 pivot individually on the shaft 45 to permit masses of tops, beet crowns and the like to pass over onto the stripper members 35 and onto the cross conveyor. In the event the pivoting of the fingers 74 is not sufficient to permit the passage of, for example, a beet, large clod or the like, the entire back rack unit 40 may swing or shift generally rearwardly by virtue of the mounting of the frame 41 on the generally vertically extending links. After the beet, clod, or other object has passed over beyond the back rack fingers 74, the latter and/or the frame 41 resumes its normal position, as shown in Figure 3.

While we have shown and described above the preferred structure in which the principles of the present invention have been incorporated, it is to be understood that our invention is not to be limited to the particular means, shown and described above, but that, in fact, widely different means may be employed in the broader aspects of our invention.

What we claim, therefore, and desire to secure by Letters Patent is:

1. In a harvester, a supporting frame, a back rack frame, generally parallel links pivotally connected between said supporting frame and said back rack frame and disposed in a generally vertical position to provide for generally fore-and-aft movement of said back rack frame, and spring-biased fingers pivotally carried by said back rack frame for movement relative to the latter about a generally transverse horizontal axis, whereby said spring-biased fingers may move in a generally fore-and-aft direction in addition to the fore-and-aft movement of said back rack frame by virtue of said parallel links.

2. In a harvester having a topping unit frame, a top conveyor thereon, and a top pick up drum for directing tops to said conveyor, the improvement comprising a back rack frame, a plurality of finger elements movably carried by said back rack frame and having top-engaging means serving to keep the tops engaged with said pick up drum, means supporting the back rack frame for generally fore-and-aft movement on said topping unit frame toward and away from said top pick up drum, and spring means acting between said frames for yieldably opposing said movement.

3. In a harvester, a supporting frame, a back rack frame, one of said frames being disposed above the other, a pair of generally vertical links pivotally connected at their upper and lower ends with said frames, respectively, so as to support said back rack frame on said first frame for translational movement relative to the latter in a plane generally parallel the said supporting frame, a plurality of top-engaging fingers pivotally carried on said back rack frame for swinging movement relative thereto about an axis generally parallel to said plane and generally normal to the direction of said movement, stop means connected with said frame and fingers so as to act between said frame and said fingers for limiting movement of the latter about said axis in one direction, and spring means connected between said fingers and said back rack frame for yieldably opposing movement of said fingers about said axis in the other direction.

4. In a harvester of the type including a top pick-up unit and a supporting frame therefor, the improvement comprising a device for holding tops and the like against said unit, said device including a frame, a plurality of top-engaging fingers, means resiliently connecting said fingers with said last mentioned frame, two pairs of generally parallel links adapted to be pivotally connected at one end with said supporting frame, means pivotally connecting the other end of each of said links with said last mentioned frame, swinging of said links serving to accommodate movement of said second mentioned frame toward and away from said unit, and means connected with said last mentioned frame and adapted to be connected with said supporting frame for resiliently opposing movement of said last mentioned frame relative to said supporting frame.

5. In a harvester, the combination of a top pickup unit including a supporting frame, an oscillatable frame, means mounting said latter frame on said supporting frame for movement toward and away from said top pickup unit, a plurality of top-engaging fingers, means mounting said fingers on said oscillatable frame in a position adjacent said pick-up unit, said mounting means including means providing for movement of said fingers relative to said second mentioned frame about a transverse axis, spring means connected between said fingers and said second mentioned frame and acting to urge said fingers to move about said axis in a direction to shift portions of said fingers toward said unit, and stop means carried by said second frame and acting against said fingers for limiting movement of said finger portions toward said pick-up unit.

6. In a harvester of the type including a top pickup drum, the improvement comprising a back rack frame, a shaft carried thereby, a plurality of brackets pivotally mounted on said shaft, a plurality of back rack fingers, one for each of said brackets, an upwardly directed extension fixed to each bracket; each extension having a slot receiving the upper portion of the associated finger, and fastening means for fixing each of said fingers in the associated bracket at different vertical positions in the slotted portions of said extensions.

References Cited in the file of this patent

UNITED STATES PATENTS

| 134,997 | Marion et al. | Jan. 21, 1873 |
| 548,491 | Westman | Oct. 22, 1895 |
| 590,103 | Jenks | Sept. 14, 1897 |
| 1,695,572 | Berry et al. | Dec. 18, 1928 |
| 2,433,799 | Walz et al. | Dec. 30, 1947 |

FOREIGN PATENTS

| 646,136 | Great Britain | Nov. 15, 1950 |